United States Patent [19]

Lisec

[11] Patent Number: 4,973,436

[45] Date of Patent: Nov. 27, 1990

[54] PROCESS OF FILLING THE EDGE JOINTS OF INSULATING GLASS PANES WITH SEALING COMPOUND

[76] Inventor: Peter Lisec, Bahnhofstrasse 34, A-3363 Amstetten-Hausmening, Austria

[21] Appl. No.: 419,678

[22] Filed: Oct. 11, 1989

Related U.S. Application Data

[63] Continuation-in-part of Ser. No. 328,152, Mar. 24, 1989, abandoned.

[30] Foreign Application Priority Data

Apr. 11, 1988 [AT] Austria .................................. 942/88
Sep. 27, 1988 [AT] Austria .................................. 2383/88

[51] Int. Cl.[5] ...................... B29C 47/06; B29C 47/92; B32B 31/06

[52] U.S. Cl. .................................. 264/40.1; 456/109; 456/356; 264/261; 264/263; 425/110; 425/135

[58] Field of Search .................... 264/40.1, 40.5, 40.7, 264/261, 263; 425/110, 135, 150; 156/356, 109, 292

[56] References Cited

U.S. PATENT DOCUMENTS 2,275,811 3/1942 Woelfel .
3,677,681 7/1972 Zippel et al. .................. 264/40.1 X
4,234,372 11/1980 Bernhard et al. .................. 156/356
4,422,541 12/1983 Lisec .................................. 198/627
4,519,962 5/1985 Schlienkamp ...................... 264/40.7
4,559,001 12/1985 Wiedenhöfer et al. ......... 264/261 X

FOREIGN PATENT DOCUMENTS 0252066 1/1988 European Pat. Off. .
2816437 8/1979 Fed. Rep. of Germany .
2845475 9/1979 Fed. Rep. of Germany .
2907210 9/1979 Fed. Rep. of Germany .
2846785 12/1979 Fed. Rep. of Germany .
2834902 2/1980 Fed. Rep. of Germany .
3038425 2/1984 Fed. Rep. of Germany .
2560813 9/1985 France .
158766 2/1983 German Democratic Rep. .
2016960 9/1979 United Kingdom .

*Primary Examiner*—Jan H. Silbaugh
*Assistant Examiner*—Karen D. Kutach
*Attorney, Agent, or Firm*—Young & Thompson

[57] ABSTRACT

A process for filling the edge joints of insulating glass by introducing a sealing compound into the edge joint from at least one filling nozzle moved along the edge joint. The depth of the edge joint is detected, and the velocity at which the filling nozzle is moved along the edge joint is slowed down in case of a deeper edge joint and increased in case of a less deep edge joint. The amount of sealing compound conveyed through the filling nozzle per unit time is detected, and the velocity with which the filling nozzle is moved along the edge joint is reduced in case of a reduced delivery output and increased in case of an increased delivery output.

14 Claims, 3 Drawing Sheets

Figure 1:
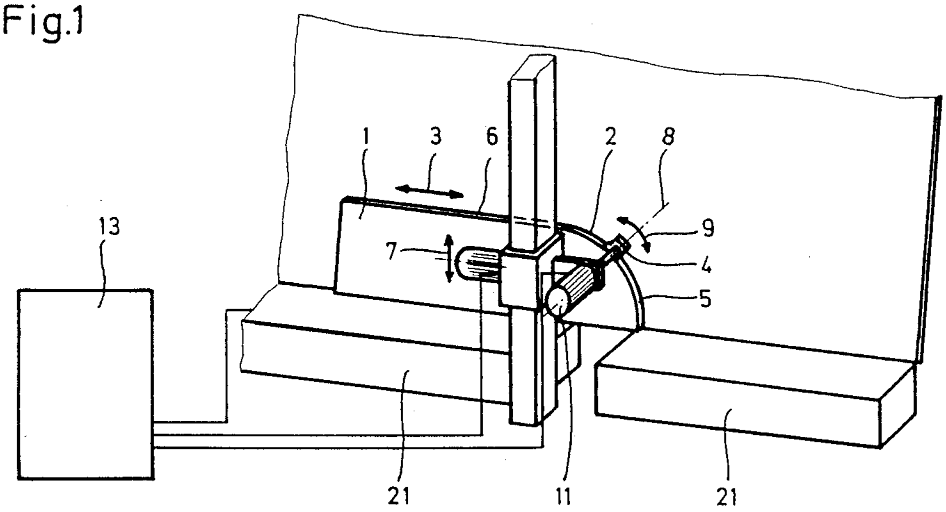

PROCESS OF FILLING THE EDGE JOINTS OF INSULATING GLASS PANES WITH SEALING COMPOUND

This application is a continuation-in-part of my copending application Ser. No. 07/328,152 filed Mar. 24, 1989.

The invention relates to a process for filling the edge joints of insulating glass wherein sealing compound is introduced into the edge joint from at least one filling nozzle moved along the edge joint, the depth of the edge joint being detected, and the velocity at which the filling nozzle is moved along the edge joint being slowed down in case of a deeper edge joint and being increased in case of a less deep edge joint.

In conventional sealing devices, the amount of sealing compound transported to the filling nozzle is adapted to the respectively needed quantity of sealing compound by means of valves and/or by controlling the conveying means (gear pumps, extruders, conveying cylinders operated with a hydraulic medium). This is difficult on account of the inertia of the devices since changes cannot be executed in a brief time period. Additionally, due to the elasticity of the conduits between the conveying means (pump) and the filling nozzle, increases in the amount conveyed become effective only at a delay, and, conversely, when the amount conveyed is reduced, too much sealing compound will still be discharged from the filling nozzle for a certain length of time. Furthermore, the minor changes cannot be adjusted accurately and quickly with the aid of proportional valves.

DOS 2,907,210 discloses a sealing method wherein throttling of the feed of sealing compound takes place in all cases simultaneously with a slowing down of the movement of the insulating glass pane. In DOS 2,907,210, the flow of the sealing compound through the filling nozzle and the relative speed between the filling nozzle and the insulating glass pane are to be continuously increased at the beginning of the movement and continuously decreased at the end of the movement, in mutual proportionality. DOS 2,907,210 also mentions problems of this regulation, namely the need for "delayed" actuation of the pump drive mechanism.

East German Patent No. 158,766 and French Patent No. 2,560,813 disclose compensating changes in the cross-sectional size (depth) of the edge joint when sealing insulating glass by moving the filling nozzle, with constant delivery output of sealing compound through the filling nozzle, at a slower speed in the zone of a deeper section of the edge joint and at a faster speed in the zone of a less deep section of the edge joint. The position or size of a lobe of sealing compound forming in front of the filling nozzle in the edge joint is utilized in East German Patent No. 158,766 and in French Patent No. 2,560,813 as a criterion for the amount of sealing compound needed per unit length of the edge joint for the proper filling of the latter.

This mode of operation cannot compensate with the required speed for relatively large changes in the depth of the edge joint. Moreover, this process presupposes that the lobe of sealing compound is present and can be detected. This is not the case, for example, at the beginning of a sealing step. Since there is a "beginning" during the sealing of insulating glass in each corner, i.e. usually four times, the drawback of the conventional process is readily apparent, since the filling of the edge joints with sealing compound is especially critical precisely in the corner region.

The invention is based on the object of indicating a process of the type discussed hereinabove wherein the amount of sealing compound introduced into the edge joint can be adjusted to the respectively required amount in a simple and accurate fashion and without time delays.

The invention attains this object by detecting the amount of sealing compound conveyed per unit time through the filling nozzle, and by reducing the speed with which the filling nozzle is moved along the edge joint in case of a reduced delivery output, and increasing this speed in case of an increased delivery output.

In the process of this invention, the amount of sealing compound needed on the average is set by a corresponding adjustment of the conveying means (e.g. gear pump, cylinder pump) and of the valves and is maintained essentially constant during the entire sealing procedure. For this purpose, the width and (average) depth of the edge joint are determined. During the sealing step, the filling nozzle is moved along the sections of the edge joint by moving the insulating glass and/or the nozzle holder. Since the width of the edge joint does not vary, the depth of the edge joint is determined with the aid of a mechanical or no-contact scanning device (feeler), as a measure for the cross section of the edge joint and thus for the required quantity of sealing compound.

In case a change in the depth of the edge joint is detected with the aid of the scanning device, the relative speed between the filling nozzle and the edge joint, and thus the amount of sealing compound introduced into the edge joint per unit length thereof, is correspondingly increased and, respectively, reduced.

This change in the relative speed, i.e. the velocity with which the filling nozzle moves along the edge joint, can be executed quickly and without delay even on a relatively large scale. In this connection, it is preferred according to the invention to vary the velocity with which the filling nozzle travels and/or the velocity with which the insulating glass pane is moved.

The process according to this invention permits sealing without any problems even in the corner region, and sealing of insulating glass panes that are not rectangular in which, as experience has shown, especially great changes arise in the depth of the edge joint since there are frequently manually bent spacer frames present between the glass plates of the insulating glass pane.

Changes in the depth of the edge joint (the width of the latter being substantially constant) caused by inaccurately placed and/or manually bent spacer frames and occurring especially also in the corner zone can be readily controlled in the sealing step according to the process of this invention, particularly when utilizing so-called "servomotors" with a high startup power for driving the nozzle holder and for driving the conveying means for the insulating glass.

In the process of this invention, the amount of sealing compound conveyed per unit time through the filling nozzle is detected and the speed at which the filling nozzle is moved along the edge joint is reduced with decreased delivery output and increased with elevated delivery output. Thus, it is possible to compensate for changes in the delivery output of the conveyor means for the sealing compound, which changes can arise, for example, due to a change in temperature of the sealing compound to be transported to the filling nozzle (warmer sealing compound can be transported more readily than colder sealing compound). For this reason, it is no longer necessary in the process of this invention to take special measures in order to keep the delivery output of sealing compound exactly constant. It is understood that changes in the relative velocity between the filling nozzle and the insulating glass pane will be superimposed, on account of a change in the delivery output of sealing compound by the filling nozzle, over changes in the relative velocity, on account of a varying depth of the edge joint. Thus, the case can occur, for example, that a reduction in the relative velocity in a zone where the edge joint is deeper is partially or entirely eliminated by an increase in the relative velocity if the delivery output of sealing compound increases. The actual change in relative velocity between the filling nozzle and the edge joint then corresponds to the sum total of the two changes in relative velocity.

The invention furthermore concerns a process for filling the edge joints of insulating glass panes having an arbitrarily shaped outer contour with sealing compound wherein the geometrical data of the outer contour or of portions of the outer contour of the insulating glass panes are present in stored form.

Facilities for the automatic filling of edge joints of insulating glass panes have been known, for example, from U.S. Pat. No. 2,275,811, DOS 2,834,902, DOS 2,845,475 (=British Patent No. 2,016,960), German Patent No. 2,816,437, and DAS 2,846,785.

However, such facilities merely permit filling of the edge joints of insulating glass panes with linear outlines.

It is known from EP-A-252,066 to control a sealing station based on the stored data of the insulating glass panes. EP-A-252,066 contains a concrete disclosure of controlling the movements of the filling nozzle(s) and of the insulating glass pane, as well as the amount of filling compound introduced by means of data carriers attached to the insulating glass. The capacity of these data carriers, however, is limited so that they can contain only a limited number of the actually needed data. The idea of varying the speed with which the filling nozzles are moved along the edge joint of insulating glass panes has not been described in EP-A-252,066.

The present invention is based on the additional object of permitting automatic filling of the edge joints of insulating glass panes having an arbitrarily shaped outer contour.

According to the invention, this object has been attained by providing that, based on these geometrical data, the regulation of the movement of the at least one filling nozzle and/or of the insulating glass pane is carried out, and that the filling nozzle is swung about an axis of rotation normal to the insulating glass pane in such a way that the filling nozzle in all instances faces the contour edge of the insulating glass pane. This process can be combined with special advantage with the process according to one of claims 1-3. It is then not only possible to seal insulating glass panes having an arbitrary contour, but also to ensure in all instances a brimming filling of the edge joint with sealing compound. This is of considerable practical importance because of the aforedescribed problems encountered in connection with manually made spacer frames frequently utilized in such insulating glass panes.

In order to adapt the relative velocity between the filling nozzle and the insulating glass pane to the respective component section of the outer contour, the procedure according to an advantageous embodiment of the invention resides in varying the speed of the movement of the insulating glass pane in the horizontal direction and in changing the speed of the movement of the filling nozzle normal to the direction of movement of the insulating glass pane.

The rotation of the filling nozzle about an axis of rotation normal to the plane of the insulating glass is preferably conducted by means of a stepping motor. Thereby the desired angle of attack of the filling nozzle with respect to the countour edge during the movement of the sealing member along this edge is maintained in all cases.

According to the invention, the movement of the sealing member and/or of the insulating glass pane is controlled by a process computer on the basis of the stored geometrical data.

It is especially advantageous to effect control based on the geometrical data utilized by the process computer of a glass cutting table since in this case already present data can be further utilized.

For determining the geometrical data, it is also possible to have a measuring head, e.g. a light scanning head, travel along the outer contour of the insulating glass pane and transmit the measured data, based on a coordinate system, to a process computer where the data are stored. In this way, contours that are not exactly defined mathematically or geometrically can likewise be detected and utilized for control.

Another possibility for mathematically and geometrically defined contour shapes which have not as yet been stored resides in introducing the geometrical data manually into the process computer.

It is also possible in the process of this invention to assign to the geometrical data of irregularly shaped insulating glass panes a code under which the data are stored and retrievable again.

In an advantageous embodiment of the process according to this invention, the procedure can be such that the velocity with which the filling nozzle is moved along the edge joint of the insulating glass pane is higher in the zone of linear and/or little curved edge joint sections than in the zone of corners and/or more strongly curved portions of the edge joint, the amount of sealing compound conveyed to the filling nozzle per unit time being larger at a higher relative velocity between the filling nozzle and the insulating glass pane than in case of a lower relative velocity. This version of the process according to the invention makes use of the realization that linear and only slightly curved sections of the edge joint can be sealed with a higher relative speed between the filling nozzle and the insulating glass pane, i.e. more quickly, than corners or sections of the edge joint having a small radius of curvature. Also this version of the process according to this invention can be combined with advantage with the method according to one of claims 1-3. The changes in relative speed as per claims 1-3 then are based on higher and, respectively, lower absolute conveyor outputs and, respectively, relative speeds.

Figure 2:
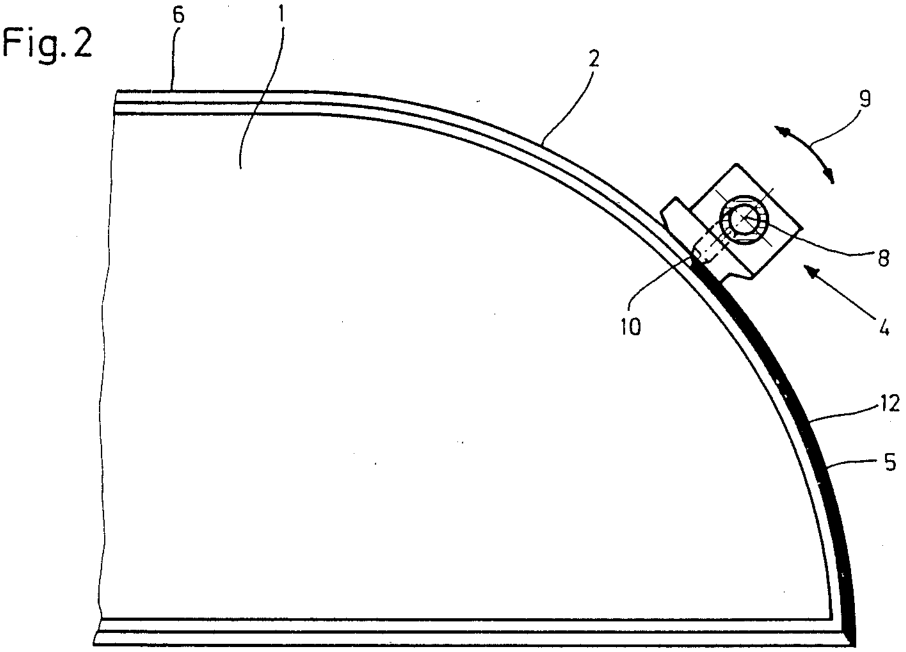
Figure 3:
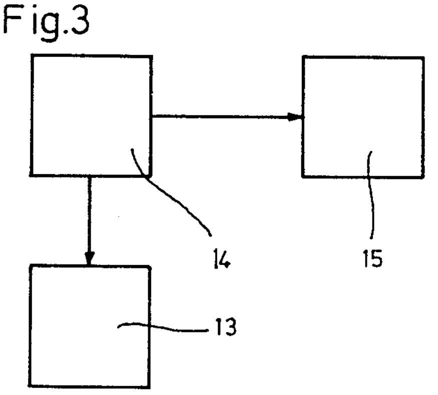
Figure 5:
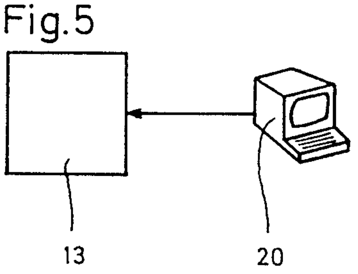
Figure 4:
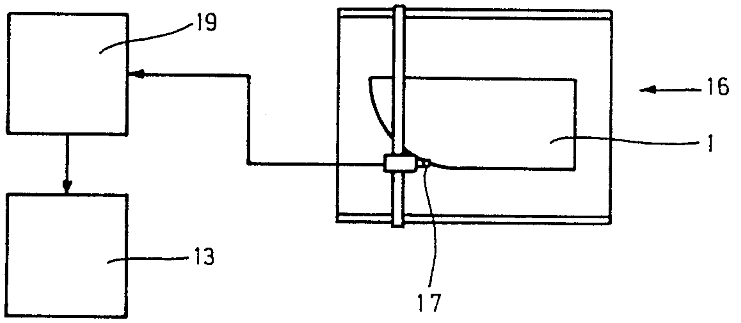
Figure 6:
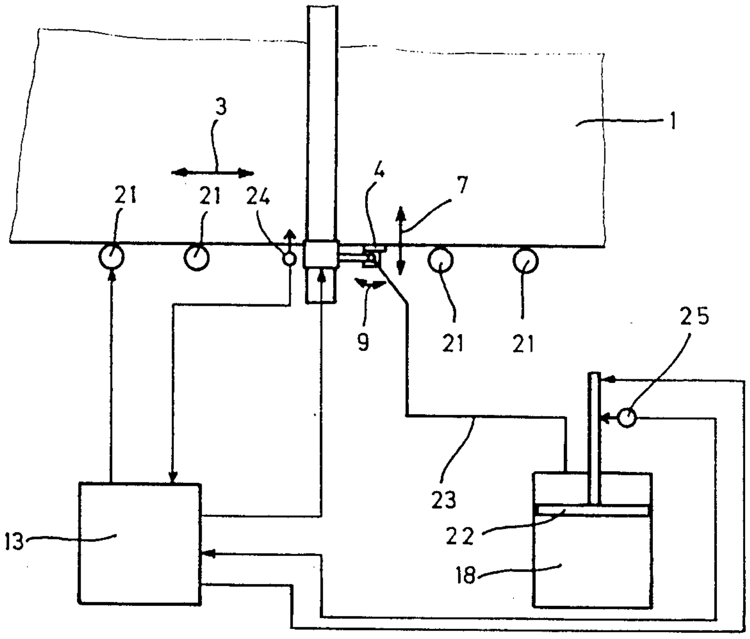
Figure 7:
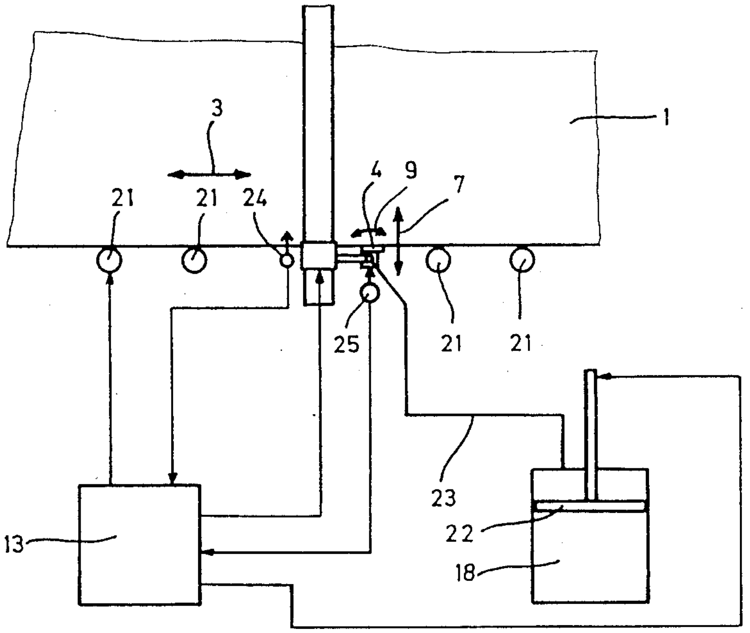

The invention will now be described in greater detail with reference to the drawings wherein:

FIG. 1 shows in schematic representation an oblique view of a facility for performing the process according to this invention, FIG. 2 shows an enlarged illustration of a detail of this facility, FIGS. 3–5 show schematically the data flow of the geometrical data of an insulating glass pane, FIG. 6 is a diagram of the control of a sealing facility, and FIG. 7 is a diagram of another embodiment of the control of a sealing facility.

An insulating glass pane 1 having an outer contour 2 fashioned to be arcuate along a section of its periphery is moved at variable speed in the direction of double arrow 3 on a horizontal conveyor 21 which can be constructed as described in DOS 3,038,425. In this arrangement, the speed of the insulating glass pane 1 is lower at the time the filling nozzle 4 is located at point 5 of the outer contour of the insulating glass pane 1 than when the filling nozzle 4 is located at point 6 of the outer contour 2.

The velocity of the filling nozzle 4 in the direction of double arrow 7, i.e. normal to the direction of movement of the insulating glass pane 1, is likewise varied, the velocity of the filling nozzle 4 in this case decreasing during movement from point 5 to point 6 of the outer contour 2.

During this movement, rotation of the filling nozzle 4 takes place about an axis 8 lying normal to the plane of the insulating glass pane 1, in the direction of double arrow 9. Owing to this rotational movement of the filling nozzle 4, brought about by a motor 11, preferably a stepping motor or a hydraulic motor, the correct orientation of the nozzle orifice 10 of the filling nozzle 4 with respect to the outer contour 2 of the insulating glass pane 1 is maintained in all instances.

However, it is likewise possible to vary, during movement of the filling nozzle 4, the orientation of its nozzle orifice 10 with respect to the .insulating glass pane 1 in dependence on the geometry of the contour shape and the relative speed, if this is necessary in special cases.

Control of the movements of the insulating glass pane 1 and of the sealing member 4, as well as of the amount of sealing compound 12 introduced per unit time by the filling nozzle 4 into the edge joint takes place based on the geometrical data of the insulating glass pane 1 stored in the process computer 13.

FIG. 3 illustrates schematically the data flow of the geometrical data of the insulating glass pane from the process computer 14 controlling a glass cutting table 15 to the process computer 13 of the sealing facility.

FIG. 4 indicates schematically a measuring table 16 with an insulating glass pane 1, the outer contour of which is scanned by a light scanning head 17 wherein the thus-obtained measured data are transmitted to a process computer 19 and from the latter to the process computer 13 of the sealing facility.

FIG. 5 finally shows a version of an embodiment wherein the geometrical data of an insulating glass pane are fed manually into a computer 20 and are from there transmitted to the process computer 13 of the sealing facility.

The structure of the facility for performing the process of this invention is not limited to a single filling nozzle 4 but rather includes the simultaneous operation of two or even several filling nozzles 4 at various locations along the outer contour of the insulating glass pane 1 and, respectively, also permits simultaneous filling of the edge joints of multiple-pane insulating glass with filling nozzles disposed side-by-side, unless cluster nozzles are utilized.

By means of the process of this invention, when using a horizontal conveyor, e.g. the conveying device known from German Patent No. 3,038,425, insulating glass panes can be sealed which exhibit at least one linear edge.

In case insulating glass panes without linear edges are to be sealed, the movement of the insulating glass panes can be brought about by means of conveying units laterally engaging the panes and equipped, for example, with suction cups.

Although sealing facilities having several filling nozzles can be utilized for performing the process according to this invention, facilities having a single filling nozzle will normally be given preference. The reason for this resides in that the relative velocity between the lower, horizontal (linear) rim of the insulating glass pane and the filling nozzle changes when the second filling nozzle is moved along the section of the edge joint projecting upwardly from the horizontal conveyor. Furthermore, contour configurations can occur wherein the direction of travel of the movement of the insulating glass pane must be reversed, which would entail a considerable control expenditure for regulating the quantity of sealing compound to be expended by the filling nozzle associated with the bottom rim of the insulating glass pane.

FIG. 6 serves for explaining the control of a facility for filling the edge joint of an insulating glass pane 1 ("sealing facility"), illustrated merely by a horizontal conveyor constituted by conveying rollers 21, a filling nozzle 4, and a storage tank 18 for sealing compound. In this facility, the sealing compound contained in the storage tank 18 and under the force of a piston 22 is transported by pumps, not shown, via a flexible conduit 23 to the filling nozzle 4.

A sensor 24 detects the depth of the edge joint of the insulating glass pane 1 to be filled. A further sensor 25 detects the movements of the piston 22 and thus the respective delivery output of sealing compound to the filling nozzle 4. The data picked up by the sensors 24 and 25 are fed to the process computer 13 of the sealing facility.

The process computer 13 issues control commands to the horizontal conveyor 21 for the movements of the insulating glass pane 1 in the direction of double arrow 3 and to the drive mechanism for moving the filling nozzle 4 in the direction of double arrow 7. Furthermore, the process computer 13 regulates the feeding output of sealing compound to the filling nozzle 4 through the conduit 23.

By varying the relative velocity between the filling nozzle 4 and the insulating glass pane 1 in dependence on the depth of the edge joint picked up by the sensor 24 and on the feeding output determined by the sensor 25, the quantity of sealing compound introduced into the edge joint per unit length of the latter is regulated so that the edge joint is always filled with sealing compound to the desired extent—normally full to the brim.

The flow rate of sealing compound from the storage tank 18 to the filling nozzle 4 can be raised in the zone of linear edge joints (e.g. section 6 in FIG. 1 wherein the relative speed between filling nozzle and insulating glass pane is higher) and can be reduced in the region of curved edge joints (e.g. section 5 in FIG. 1 [lower relative speed]). Even in case of an intentionally altered delivery output, as described above, the above-mentioned process according to this invention ensures an always correct filling of the edge joints of insulating glass panes even if the depth thereof changes.

The sealing process of this invention can be performed with insulating glass panes that are moved lying horizontally as well as standing essentially perpendicularly, the latter version being preferred.

The sensor 25 of the arrangement shown in FIG. 6 can also be associated with the metering cylinder, not shown in FIG. 6, that is normally correlated with the filling nozzle 4. In this embodiment, the delivery output of sealing compound to the filling nozzle 4 is picked up by the sensor 25 by detection of movements of the metering piston in the metering cylinder in the immediate vicinity of the filling nozzle 4. Thus, a further increase in control accuracy is obtained since losses of sealing compound that can occur, for example, during transport thereof from the storage tank to the metering cylinder remain without influence.

In the embodiment of a sealing facility shown in FIG. 7, the sensor 25 is fashioned as a flowmeter and is directly associated with the filling nozzle 4. The sensor 25 in this arrangement directly picks up the value of the amount of sealing compound actually introduced into the edge joint by the filling nozzle 4. Otherwise the sealing facility illustrated in FIG. 7 operates in the same way as has been disclosed in connection with the embodiment shown in FIG. 6.

What is claimed is:

1. Process for filling an edge joint of insulating glass panes, the edge joint having a varying depth wherein sealing compound is introduced at a variable amount per unit time, into the edge joint from at least one filling nozzle moved along the edge joint at a variable velocity, the depth of the edge joint being detected and the velocity at which the filling nozzle is moved along the edge joint being slowed down in response to detection of a deeper edge joint and being increased in response to detection of a less deep edge joint, and characterized in that the amount of sealing compound conveyed through the filling nozzle per unit time is detected, and that the velocity with which the filling nozzle is moved along the edge joint is reduced in response to detection of a reduced amount of sealing compound conveyed through the filling nozzle per unit time and increased in response to detection of an increased amount of sealing compound conveyed through the filling nozzle per unit time such that a brimming filling of the edge joint with the sealing compound is achieved.

2. Process according to claim 1, characterized in that the velocity at which the filling nozzle is moved is varied.

3. Process according to claim 1, characterized in that the amount of sealing compound conveyed per unit time through the filling nozzle is detected by a measuring device directly arranged at the filling nozzle.

4. Process according to claim 1 or 2, characterized in that the velocity at which the insulating glass pane is moved is varied.

5. Process for filling the edge joint of insulating glass pane of an arbitrarily configured outer contour with sealing compound in accordance with claim 1, wherein geometrical data of the outer contour or of portions of the outer contour of the insulating glass pane are present in stored form, and the control of the velocity of the movement of the filling nozzle with respect to the edge joint of the insulating glass pane is performed based on the geometrical data, and the filling nozzle is swung about an axis of rotation normal to the insulating glass pane in such a way that the filling nozzle always faces the configured contour of the insulating glass pane.

6. Process according to claim 5, characterized in that the velocity of the movement of the insulating glass pane in the horizontal direction is varied.

7. Process according to claim 5, characterized in that the velocity of the movement of the filling nozzle normal to the direction of travel of the insulating glass pane is varied.

8. Process according to claim 5, characterized in that rotation of the filling nozzle is effected by a stepping motor.

9. Process according to claim 5, characterized in that a code is assigned to the geometrical data of an irregularly shaped insulating glass pane, under which code the data are stored and again retrievable.

10. Process according to claim 5, characterized in that the velocity at which the filling nozzle is moved along the edge joint of the insulating glass pane is higher in the region of linear edge joint sections than in the region of corners of the edge joint, the quantity of sealing compound conveyed per unit time through the filling nozzle being larger at a higher relative velocity between the filling nozzle and the insulating glass pane than in case of a lower relative velocity.

11. Process according to claim 5, characterized in that control of the velocity of the movement of the filling nozzle with respect to the edge joint of the insulating glass pane is effected by a process computer based on the stored geometrical data.

12. Process according to claim 11, characterized in that the control takes place based on the geometrical data utilized by the process computer of a glass cutting table.

13. Process according to claim 11, characterized in that a measuring head travels along the outer contour of the insulating glass pane and transmits measured data, based on a coordinate system, to the process computer where the data are stored.

14. Process according to claim 13, characterized in that the geometrical data are fed manually into the process computer.

* * * * *